United States Patent
Szafraniec et al.

(10) Patent No.: US 7,272,280 B2
(45) Date of Patent: Sep. 18, 2007

(54) OPTICAL COUPLER FOR MEASURING WAVELENGTH

(75) Inventors: Bogdan Szafraniec, Sunnyvale, CA (US); Charles Lange, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/013,773

(22) Filed: Dec. 16, 2004

(65) Prior Publication Data

US 2006/0133734 A1 Jun. 22, 2006

(51) Int. Cl.
*G02B 6/26* (2006.01)

(52) U.S. Cl. .............................. 385/50; 385/15; 385/39

(58) Field of Classification Search ................. 385/15, 385/39, 50

See application file for complete search history.

(56) References Cited

U.S. PATENT DOCUMENTS

| | | | | |
|---|---|---|---|---|
| 4,298,794 A | 11/1981 | Snitzer et al. | ................ | 250/227 |
| 4,536,058 A | 8/1985 | Shaw et al. | ................ | 350/320 |
| 4,601,541 A | 7/1986 | Shaw et al. | ................ | 350/320 |
| 4,738,511 A | 4/1988 | Fling | ................ | 350/96.15 |
| 4,755,022 A | 7/1988 | Ohashi et al. | ................ | 350/96.33 |
| 4,796,968 A | 1/1989 | Coccoli et al. | ................ | 350/96.15 |
| 4,869,567 A | 9/1989 | Millar et al. | ................ | 350/96.15 |
| 5,029,961 A | 7/1991 | Suzuki et al. | ................ | 350/96.15 |
| 5,042,896 A | 8/1991 | Dahlgren | ................ | 385/31 |
| 5,066,087 A | 11/1991 | Yamauchi et al. | ................ | 385/43 |
| 5,078,465 A | 1/1992 | Dahlgren | ................ | 385/50 |
| 5,195,151 A | 3/1993 | Campbell, Jr. et al. | ................ | 385/43 |
| 5,381,230 A * | 1/1995 | Blake et al. | ................ | 356/460 |
| 5,949,934 A * | 9/1999 | Shima et al. | ................ | 385/37 |
| 6,144,788 A | 11/2000 | Ang et al. | ................ | 385/31 |
| 6,442,311 B1 * | 8/2002 | Barbarossa et al. | ................ | 385/37 |
| 6,498,879 B1 | 12/2002 | Huang et al. | ................ | 385/43 |
| 6,795,599 B2 * | 9/2004 | Spirin et al. | ................ | 385/12 |
| 6,999,662 B2 * | 2/2006 | Duguay et al. | ................ | 385/39 |

OTHER PUBLICATIONS

Tishinin, D.V., et al. "Vertical Resonant Couplers with Precise Coupling Efficiency Control Fabricated by Wafer Bonding," IEEE Photonics Techology Letters, vol. 11, No. 8, Aug. 1999.

* cited by examiner

*Primary Examiner*—Jennifer Doan
(74) *Attorney, Agent, or Firm*—McDonnell Boehnen Hulbert & Berghoff LLP

(57) ABSTRACT

An optical coupler for measuring mean wavelength of a broadband optical source is described. Sensitivity of the optical coupler to variations of refractive index and coupler length is minimized. The sensitivity to the variations of the refractive index is minimized by making a difference between the group refractive indices of the symmetric and asymmetric propagation modes approximately constant and independent of the refractive index. The sensitivity to the variations of the coupler length is minimized by selecting the coupler length that makes output powers from two waveguides to the first order insensitive to its length. This selection is possible for broadband optical sources.

13 Claims, 6 Drawing Sheets

OPTICAL COUPLER FOR MEASURING WAVELENGTH

GOVERNMENT RIGHTS

The United States Government has acquired certain rights in this invention pursuant to Contract No. DL-H-513262 awarded by the United States Navy.

FIELD

The present invention relates generally to optical couplers, and more particularly, to an optical coupler for measuring a mean wavelength of a broadband optical source.

BACKGROUND

Optical couplers are commonly used to combine and/or separate light signals with a particular class of couplers referred to as wavelength division multiplexers (WDMs). WDMs combine and/or separate the light signals based on wavelength. WDM-type couplers may also be used to measure the wavelength of the light signal based on the coupler's inherent wavelength dependence. Knowing the wavelength of the light signal may be important in many applications.

For example, in fiber optic gyroscope (FOG) applications, knowing the wavelength of the light signal traveling through the sensing coil is important for determining a scale factor of the FOG. The scale factor describes the capability of the FOG to accurately sense angular velocity at different angular rates. Thus, the scale factor of the FOG describes the sensitivity of the sensor.

Unfortunately, the optical coupler's ability to measure a light signal's wavelength may be impacted by variations of refractive index and coupler length due to the environmental variations. Therefore, it would be beneficial to fabricate an optical coupler that is relatively insensitive to these variations.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
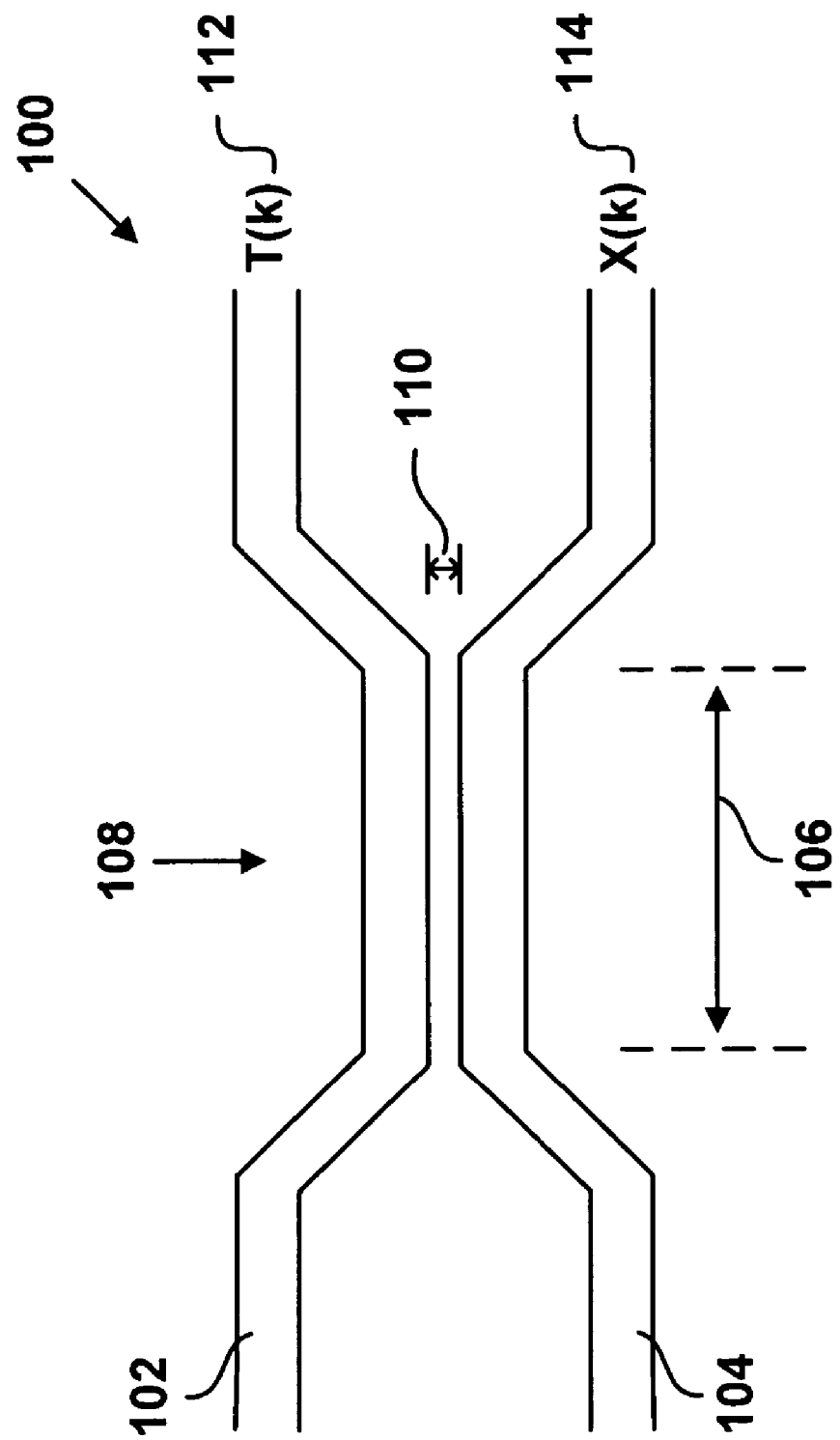
FIG. 1 is a pictorial representation of an optical coupler, according to an example.

FIG. 1 shows a pictorial representation of an optical coupler 100. FIG. 1 is not drawn to scale. The optical coupler 100 is depicted in FIG. 1 as an evanescent wave coupler. The evanescent wave coupler may be a lapped coupler; however, other coupler types may be used. For example, the optical coupler 100 may be a fused fiber coupler. The optical coupler 100 may include two waveguides, a first waveguide 102 and a second waveguide 104. However, the optical coupler 100 may have more than two waveguides.

The waveguides 102, 104 may be any structure that guides electromagnetic waves, such as light, along its length. For example, the waveguides 102, 104 may be planar waveguides, which may be composed of a thin film formed on the surface of a planar material. Alternatively, the waveguides 102, 104 may be optical fibers. The waveguides 102, 104 come in close proximity to each other for a length 106, commonly referred to as a coupler length or a transfer length. The region in which the waveguides 102, 104 are in close proximity may be referred to as a coupling region 108. The separation between the waveguides 102, 104 in the coupling region 108 may be referred to as a gap 110.

In the following explanation, it will be assumed that light enters the first waveguide 102 from the left-hand side of FIG. 1. However, in practice, light could enter either waveguides 102, 104 from either the left-hand side or the right-hand side of FIG. 1.

As light travels from left to right through the first waveguide 102, the light energy will encounter the coupling region 108. Within the coupling region 108, light energy can transfer from one waveguide to the other across the gap 110. Depending on the length 106 of the coupling region 108, the light energy may transfer between waveguides once or multiple times (including fractional transfers). The length 106 of the coupling region may be designed such that a certain percentage of the light energy couples out of one waveguide to the other waveguide and vice versa. The light energy contained within the first waveguide 102 may be referred to as the transmitted energy T(k) 112, while the light energy transferred to and contained within the second waveguide 104 may be referred to as the cross-coupled energy X(k) 114.

Figure 2:
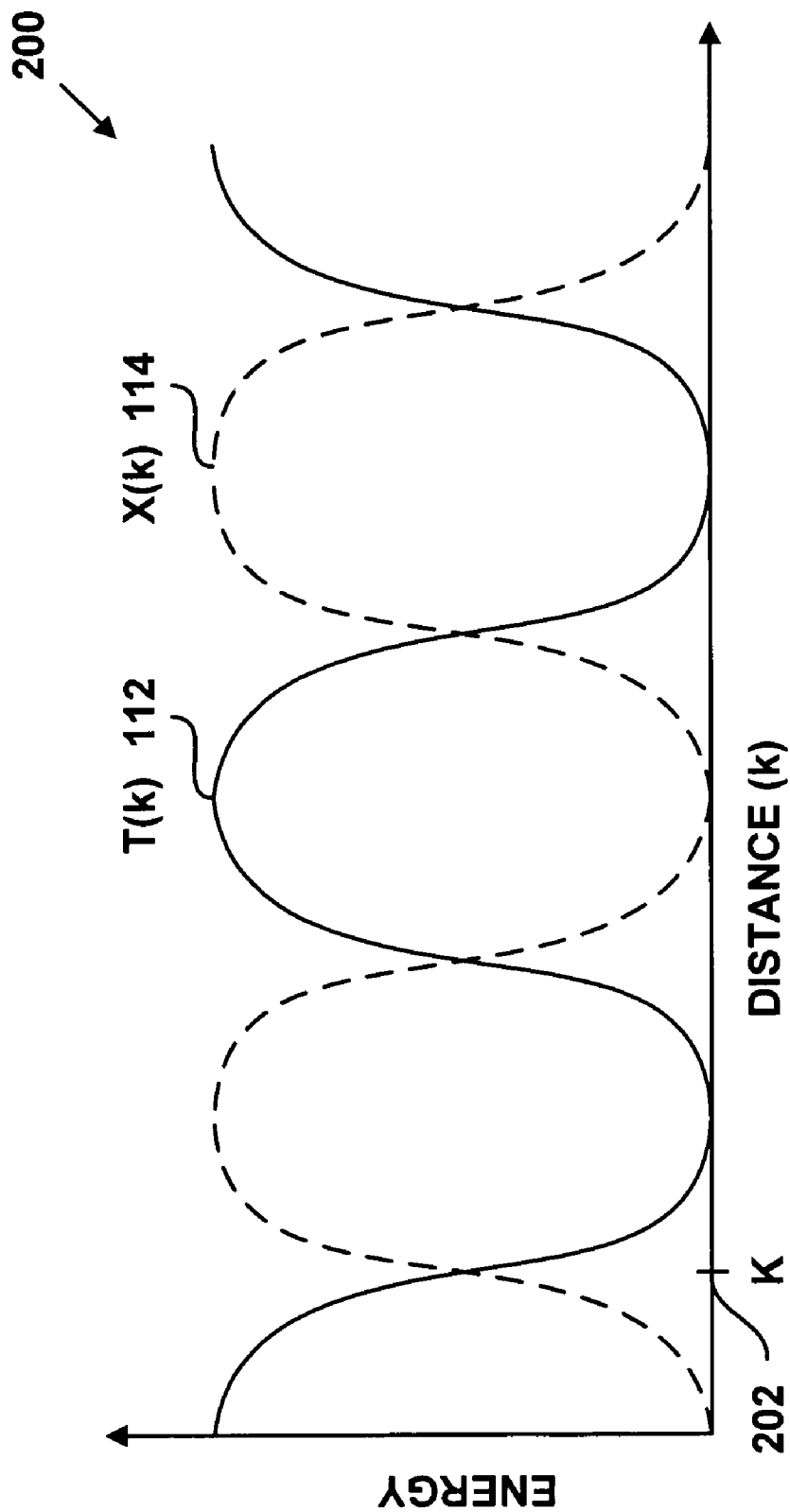
FIG. 2 is a graph of intensity of light as a function of position down a length of the optical coupler depicted in FIG. 1, according to an example.

FIG. 2 is a graph 200 of the light energy being transferred between the waveguides 102, 104 of the optical coupler 100 depicted in FIG. 1. The transmitted energy T(k) 112 is shown in the solid line, while the cross-coupled energy X(k) 114 is shown in a dashed line. As the light enters the coupling region through the first waveguide 102, the transmitted energy T(k) 112 gradually transfers to the second waveguide 104. Eventually all the transmitted energy T(k) 112 is transferred to the second waveguide 104 and becomes a cross-coupled energy X(k) 114. The process then reverses and the light in the second waveguide 104 transfers to the first waveguide 102. Accordingly, the distribution of light energy between the two waveguides 102, 104 oscillates back and forth between the waveguides 102, 104 for the length 106 of the coupling region 108. The oscillation stops at the end of the coupling region 108.

By selecting the length 106 of the coupling region 108, the transmitted energy T(k) 112 and cross-coupled energy X(k) 114 at the outputs of the coupler 100 may be determined. For example, by ending the coupling region 108 at the distance K 202, as depicted in FIG. 2, half of the light energy is retained in the first waveguide and exits the coupler 100 through the first waveguide 102 and the other half of the light energy couples to the second waveguide and exits the coupler 100 through the second waveguide 104. The light energy at the output of the coupler 100 may be defined as:

$$T = 1/2 + 1/2 \cos((2\pi/\lambda)\Delta n_g z_o) \quad \text{(Equation 1)}$$

$$X = 1/2 - 1/2 \cos((2\pi/\lambda)\Delta n_g z_o) \quad \text{(Equation 2)}$$

In equations 1 and 2, $\lambda$ is the wavelength of the light traveling through the optical coupler 100, $\Delta n_g$ is the difference in group refractive index between the symmetric and anti-symmetric (asymmetric) modes, and $z_o$ is the length 106 of the coupling region. The wavelength, $\lambda$, is the distance light travels during its period T in a vacuum.

A refractive index, n, is calculated by dividing the velocity of light in a vacuum by the velocity of light in a material. A phase refractive index, $n_p$, is a measure of how the phase of light progresses in a material. A group refractive index, $n_g$, is a measure of how a band of light travels in the material for a given spatial mode. A spatial mode is used to identify light that has a particular distribution across its wave front. The relationship between the phase refractive index and the group refractive index can be defined as:

$$n_g = n_p + k \frac{dn_p}{dk} \quad \text{(Equation 3)}$$

where the wavenumber k is equal to $$\frac{2\pi}{\lambda}.$$

Figure 3:
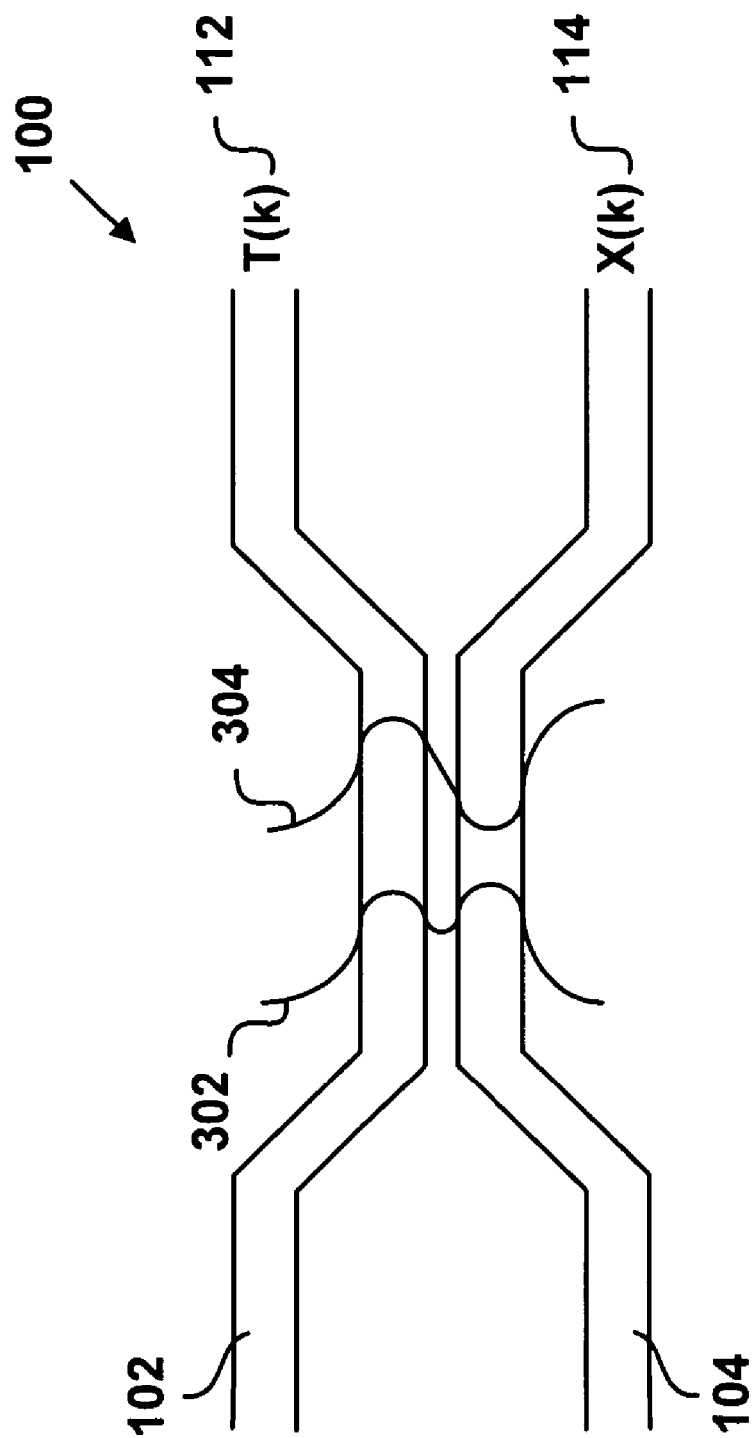
FIG. 3 is a pictorial representation of a symmetric mode and an asymmetric mode traveling through the optical coupler depicted in FIG. 1, according to an example.

FIG. 3 depicts a symmetric mode 302 and an asymmetric mode 304 traveling through the optical coupler 100. FIG. 3 is not drawn to scale. The difference in group refractive index, $\Delta n_g$, is the difference between the group refractive index for the two propagation modes of the coupler 100. In this example, the difference in the group refractive index, $\Delta n_g$, is a difference between the group refractive index of the symmetric mode ($n_{g1}$) and the group refractive index of the asymmetric mode ($n_{g2}$).

A signal f (referred to as the feedback signal) can be defined as an integral of a weighted difference between the transmitted and crossed-coupled energy. Mathematically, the signal f can be written as:

$$f = \int (T - X) \cdot S(k) dk \quad \text{(Equation 4)}$$

where S(k) denotes a power spectral density function. After substitution and integration, and assuming a Gaussian spectrum S(k) of the broadband optical source with bandwidth of $\Delta k$, the feedback signal f becomes:

$$f = \cos(k_0 \cdot \Delta n_g \cdot z_0) \cdot \exp(-\Delta k^2 \cdot z_0^2/4) \quad \text{(Equation 5)}$$

The optical coupler 100 may be designed so that it is most sensitive to changes in the mean wavenumber, $k_0$. This is obtained when the cosine function has a maximum slope, i.e., when $\cos(k_0 \cdot \Delta n_g \cdot z_0)$ is approximately zero. Then, the signal f can be approximated as:

$$f \approx \delta k \cdot \Delta n_g \cdot z_0 \cdot \exp(-\Delta k^2 \cdot z_0^2/4) \quad \text{(Equation 6)}$$

where $\delta k$ is the deviation from the desired mean wavelength, $\Delta n_g$ is the difference in the group refractive index between two propagation modes, and $z_0$ is the coupler length.

The term $z_0 \cdot \exp(-\Delta k^2 \cdot z_0^2/4)$ describes the dependence on the coupler length.

The sensitivity of the signal f to the wavenumber k, the refractive index n, and the coupler length $z_0$ can be defined as follows:

$$df = \frac{\partial f}{\partial k} dk + \frac{\partial f}{\partial n} dn + \frac{\partial f}{\partial z_0} dz_0 \quad \text{(Equation 7)}$$

$$\frac{df}{f} = \frac{d\delta k}{k} + \frac{d\Delta n_g}{\Delta n_g} + \frac{2 - \Delta k^2 \cdot z_0^2}{2} \cdot \frac{dz_0}{z_0} \quad \text{(Equation 8)}$$

The above sensitivity function indicates that the optical coupler 100 is sensitive to the deviation from the mean wavenumber, k, however, it is also sensitive to the refractive index n and to the coupler length $z_0$. Based on the above equation the optical coupler 100 can be designed to be sensitive to a mean wavelength but relatively insensitive to the perturbations of other parameters.

The terms that define the sensitivity signal df/f can be evaluated individually. The first term evaluated is the sensitivity of the optical coupler 100 to the coupler length, $z_0$. It would be desirable for the optical coupler 100 to be designed such that:

$$\frac{2 - \Delta k^2 \cdot z_0^2}{2} \cdot \frac{dz_0}{z_0} = 0 \quad \text{(Equation 9)}$$

Equation 9 is satisfied when $\Delta k^2 \cdot z_0^2 = 2$. Then, the operation of the optical coupler 100 is substantially insensitive to perturbation in the coupler length, $z_0$.

From Equation 8 above, the second term to be evaluated is the sensitivity to a difference in group refractive indices of two propagation modes. Once again, the optical coupler 100 may be designed such that:

$$\frac{d\Delta n_g}{\Delta n_g} = 0.$$

This can be achieved by selecting the waveguide structure and refractive indices as described below. By satisfying the above condition, the sensitivity of the optical coupler 100 to the refractive index can be minimized. Accordingly, the optical coupler 100 may be optimized for use in measuring wavelength.

Figure 4:
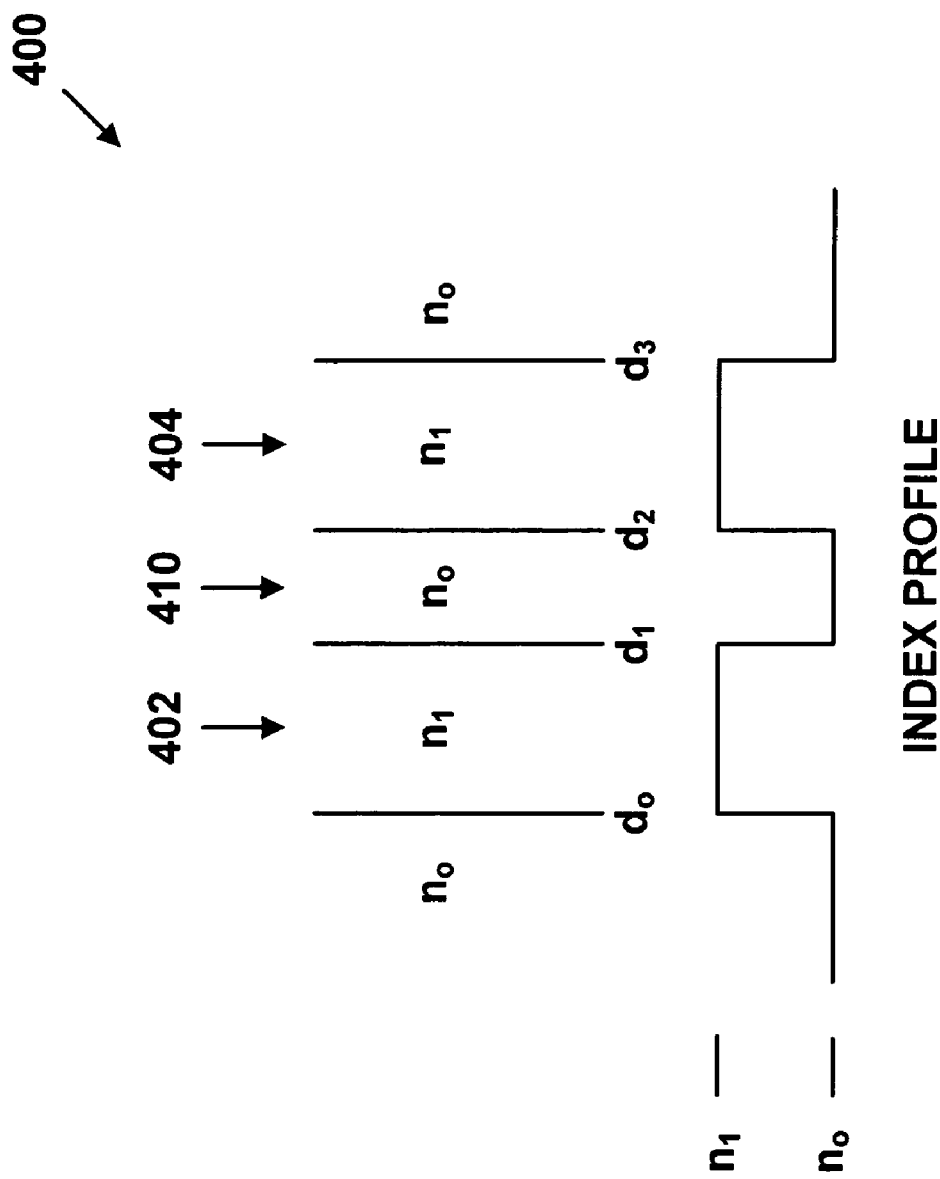
FIG. 4 is a cross sectional view of a planar waveguide optical coupler, according to an example.

FIG. 4 is a cross sectional view of a planar waveguide optical coupler 400. FIG. 4 is not drawn to scale. The planar waveguide optical coupler 400 may be substantially the same as the optical coupler 100 depicted in FIG. 1. The optical coupler 400 may be formed on a substrate. The substrate may be composed of an optical material such as silicon, aluminum gallium arsenide, or lithium niobate.

FIG. 4 depicts a first waveguide 402, a second waveguide 404, and a gap 410 between the waveguides 402, 404 that forms a coupling region of the optical coupler 400. The gap 410 may be a physical gap between the waveguides 402, 404. Alternatively, the gap 410 may represent an overlap of the modes of the waveguides 402, 404.

The refractive index of material used in the construction of the waveguides 402, 404 may be $n_0$ and $n_1$. The width of the first waveguide 402 may be described as the distance from $d_0$ to $d_1$. The width of the second waveguide 404 may be described as the distance from $d_2$ to $d_3$. The width of the gap 410 between the two waveguides 402, 404 may be described as the distance between $d_1$ and $d_2$.

By scaling dimensions of the optical coupler 400, the group refractive indices, $n_g$, may be varied. The optimum point is where sensitivity of the group refractive indices to the bulk refractive index is substantially the same for both the symmetric and asymmetric modes. The gap 410 and the width of the waveguides 402, 404 may be defined during manufacture of the optical coupler 400. The waveguides 402, 404 may be deposited on the substrate using thin film deposition or any other appropriate processing technique. Preferably, the length of the optical coupler 400 is defined by the spectral width $\Delta k$ and satisfies condition $\Delta k^2 \cdot z_0^2 = 2$. Satisfying this condition makes the operation of the optical coupler 400 relatively insensitive to the coupler length.

By selecting ratios between the gap 410 and waveguide dimensions (e.g., height, width, and length of the waveguides 402, 404), the optical coupler 400 sensitivity to the variations of refractive index and thermal expansion can be minimized. For example, the waveguides 402, 404 may have a width of approximately 5 μm and index of refraction ($n_1$) 1.5075. The waveguides 402, 404 may be formed on the substrate approximately 3 μm apart (e.g., the width of the gap 410 is 3 μm with an index of refraction ($n_0$) of 1.5).

Figure 5:
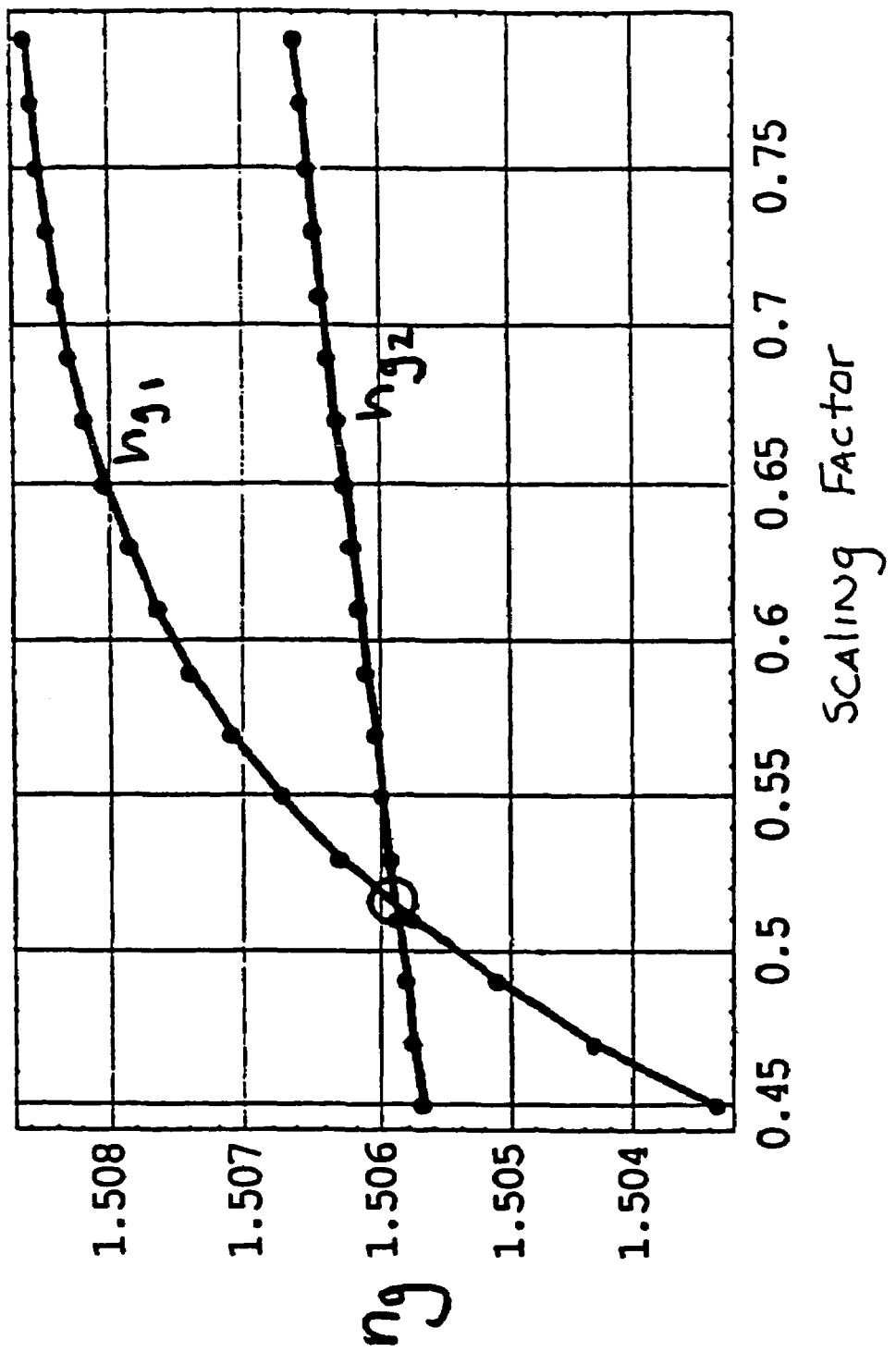
FIG. 5 is a graph of functional dependence of group refractive indices for the symmetric and asymmetric modes on the scaling of the coupler dimensions, according to an example.

FIG. 5 is a graph showing the group refractive indices, $n_{g1}$ and $n_{g2}$, as the dimension of the waveguide structure defined with reference to FIG. 4 are scaled. For example, for a scaling factor of 0.5 the physical dimensions defined in the previous paragraph are reduced by 50%.

Figure 6:
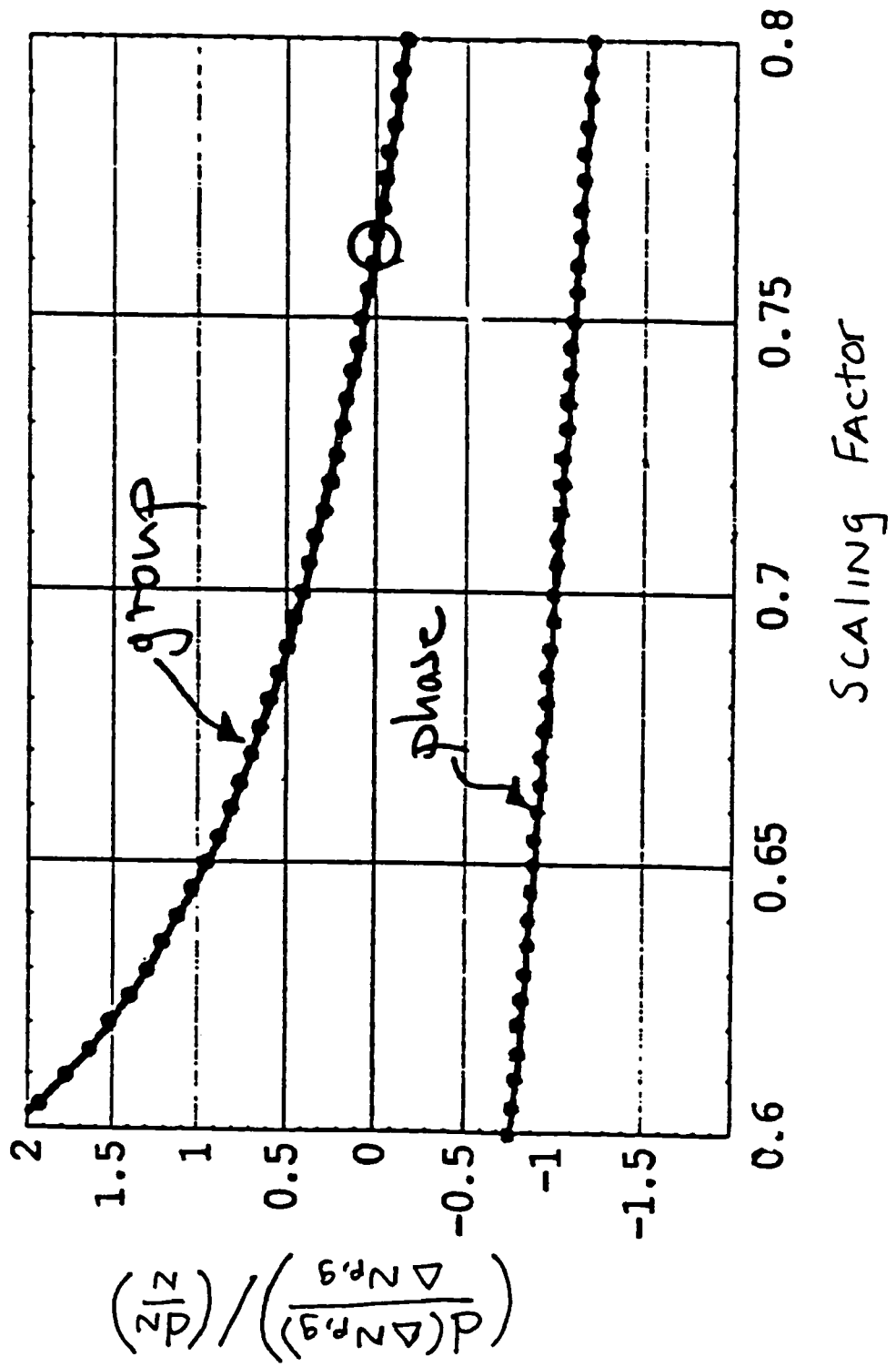
FIG. 6 is a graph of sensitivity of a group refractive index difference and a phase refractive index difference to changes in bulk material index of refraction, according to an example.

FIG. 6 shows the normalized derivatives of the phase index difference $$\frac{d(\Delta n_p)}{dn}$$

and group index difference $$\frac{d(\Delta n_g)}{dn}.$$

As well known from calculus, the zero of the derivative $$\frac{d(\Delta n_g)}{dn}$$

indicates that the group index difference $\Delta n_g = n_{g1} - n_{g2}$ is not dependent on the refractive index, n. Therefore, the plot of the group refractive index difference derivative shown in FIG. 6 indicates that the optical coupler 400 is least sensitive to variations of refractive index for the scaling factor 0.77.

For an optical coupler to be used for measuring wavelengths, the sensitivity to the refractive index and length should be substantially zero. Non-zero sensitivity results in inaccurate wavelength control when perturbations of refractive index or coupler length are present. The perturbations of the refractive index (n) and coupling length can be caused by several different factors. Perturbations of the refractive index (n) and coupling length may result from temperature variations and/or strain/stress applied to the coupler, either in tension or compression. Therefore, perturbing the temperature and/or strain/stress and measuring the change of the signal, f may be used to demonstrate the stability of the group refractive index difference derivative. This may also be done to optimize the optical coupler, i.e., to minimize sensitivity to the variations of the refractive index and to the coupler length while maintaining sensitivity to the optical wavelength.

It should be understood that the illustrated embodiments are exemplary only and should not be taken as limiting the scope of the present invention. While the invention is described using planar waveguides, it is understood that other waveguides may be used. The claims should not be read as limited to the described order or elements unless stated to that effect. Therefore, all embodiments that come within the scope and spirit of the following claims and equivalents thereto are claimed as the invention.

We claim:

1. An optical coupler, comprising in combination:
   a first waveguide; and
   a second waveguide in close proximity to the first waveguide forming a coupling region, wherein dimensions of the first and second waveguides are selected to minimize variations of a difference in group refractive indices of a symmetric propagation mode and an asymmetric propagation mode in response to changes of refractive index, and wherein a length of the coupling region is selected based on a spectral shape of a broadband optical source.

2. The optical coupler of claim 1, wherein a gap is located between the first and second waveguides in the coupling region, and wherein a width of the gap is selected to minimize sensitivity to the changes of the refractive index.

3. The optical coupler of claim 1, wherein the length of the coupling region is selected to minimize sensitivity to changes in the coupler length.

4. The optical coupler of claim 1, wherein the length of the coupling region, $z_0$, satisfies condition $\Delta k^2 \cdot z_0^2 = 2$, where $\Delta k$ is a bandwidth of the broadband optical source.

5. The optical coupler of claim 1, wherein the first and second waveguides are planar waveguides.

6. The optical coupler of claim 1, wherein the first and second waveguides are optical fibers.

7. An optical coupler, comprising in combination:
   a first waveguide; and
   a second waveguide in close proximity to the first waveguide forming a coupling region, wherein a gap is located between the first and second waveguides in the coupling region, wherein dimensions of the first and second waveguides and a width of the gap are selected to minimize sensitivity to the changes of the refractive index, and wherein a length of the coupling region is selected based on a spectral shape of the broadband optical source.

8. A method for forming an optical coupler that is sensitive to a mean optical wavelength of a broadband optical source and substantially insensitive to changes of refractive index and coupler length, comprising in combination:
   selecting dimensions of a first waveguide and a second waveguide, wherein selecting the dimensions of the first and second waveguides includes selecting the dimensions to minimize variations of a difference in group refractive indices of a symmetric propagation mode and an asymmetric propagation mode in response to the changes of the refractive index;

positioning the first waveguide to be in a close proximity to the second waveguide to form a coupling region, wherein the positioning includes:

selecting a width of a gap between the first and second waveguides, and selecting a length of the coupling region based on a spectral shape of a broadband optical source.

9. The method of claim 8, wherein selecting the width of the gap includes selecting the width of the gap to minimize sensitivity to the changes of the refractive index.

10. The method of claim 8, wherein selecting the length of the coupling region includes selecting the length of the coupling region to minimize sensitivity to changes in the coupler length.

11. The method of claim 8, wherein selecting the length of the coupling region, $z_0$, includes satisfying condition $\Delta k^2 \cdot z_0^2 = 2$, where $\Delta k$ is bandwidth of the broadband optical source.

12. An optical coupler, comprising in combination:

a first waveguide; and a second waveguide in close proximity to the first waveguide forming a coupling region, wherein a length of the coupling region, $z_0$, satisfies condition $\Delta k^2 \cdot z_0^2 = 2$, where $\Delta k$ is a bandwidth of the broadband optical source.

13. The optical coupler of claim 12, wherein a gap is located between the first and second waveguides in the coupling region, and wherein a width of the gap is selected to minimize sensitivity to the changes of the refractive index.

* * * * *